US010843798B2

(12) United States Patent
Przybyla et al.

(10) Patent No.: US 10,843,798 B2
(45) Date of Patent: *Nov. 24, 2020

(54) MAST LOCKOUT SYSTEMS FOR TILTROTOR AIRCRAFT (71) Applicant: Textron Innovations Inc., Providence, RI (US)

(72) Inventors: Mark Alan Przybyla, Keller, TX (US); Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/229,296

(22) Filed: Dec. 21, 2018

(65) Prior Publication Data
US 2019/0248483 A1 Aug. 15, 2019

Related U.S. Application Data (63) Continuation-in-part of application No. 15/897,310, filed on Feb. 15, 2018.

(51) Int. Cl.
B64D 27/14 (2006.01)
B64C 29/00 (2006.01)
B64C 11/28 (2006.01)
B64D 35/00 (2006.01)

(52) U.S. Cl.
CPC .......... B64C 29/0033 (2013.01); B64C 11/28 (2013.01); B64D 27/14 (2013.01); B64D 35/00 (2013.01)

(58) Field of Classification Search
CPC ..... B64C 27/50; B64C 29/0033; B64C 11/28; B64D 27/14; B64D 35/00
See application file for complete search history.

(56) References Cited

U.S. PATENT DOCUMENTS

| 3,528,630 | A | 9/1970 | Ferris et al. | |
| 3,592,412 | A * | 7/1971 | Glatfelter | B64C 29/0033 244/7 A |
| 6,622,962 | B1 | 9/2003 | White | |
| 8,998,125 | B2 * | 4/2015 | Hollimon | B64C 29/0033 244/7 A |
| 2016/0152329 | A1 | 6/2016 | Tzeng et al. | |
| 2017/0144746 | A1 * | 5/2017 | Schank | B64C 29/0033 |
| 2019/0016451 | A1 * | 1/2019 | Ehinger | F02C 7/36 |

* cited by examiner

Primary Examiner — Justin M Benedik
(74) Attorney, Agent, or Firm — Lawrence Youst PLLC (57) ABSTRACT

A mast lockout system for a tiltrotor aircraft having a proprotor assembly. The system includes a mast coupled to and rotatable with the proprotor assembly. A proprotor gearbox having a proprotor gearbox housing is configured to transmit torque and rotation energy to the mast. A lock assembly has first and second lock members. The first lock member is coupled to the mast between first and second mast bearings and configured to rotate with the mast. The second lock member is coupled to the proprotor gearbox housing. The lock assembly has a first position in which the first and second lock members are disengaged, thereby allowing rotation of the mast. The lock assembly has a second position in which the first and second lock members are engaged, thereby preventing rotation of the mast. The lock assembly is actuatable between the first and second positions.

20 Claims, 8 Drawing Sheets

MAST LOCKOUT SYSTEMS FOR TILTROTOR AIRCRAFT

CROSS-REFERENCE TO RELATED APPLICATIONS

This is a continuation-in-part of co-pending application Ser. No. 15/897,310 filed Feb. 15, 2018, the entire contents of which are hereby incorporated by reference.

TECHNICAL FIELD OF THE DISCLOSURE

The present disclosure relates, in general, to tiltrotor aircraft having rotary and non rotary flight modes and, in particular, to mast lockout systems for tiltrotor aircraft operable to prevent rotation of the proprotor assemblies and align the proprotor blades for folding during the non rotary flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

SUMMARY

In a first aspect, the present disclosure is directed to a mast lockout system for a tiltrotor aircraft having a proprotor assembly. The system includes a mast coupled to and rotatable with the proprotor assembly. A proprotor gearbox having a proprotor gearbox housing is configured to transmit torque and rotation energy to the mast. First and second mast bearings are configured to react loads from the mast to the proprotor gearbox housing. A lock assembly includes first and second lock members. The first lock member is coupled to the mast between the first and second mast bearings and is configured to rotate with the mast. The second lock member is coupled to the proprotor gearbox housing and is configured to be nonrotatable. The lock assembly has a first position in which the first and second lock members are disengaged, thereby allowing rotation of the mast. The lock assembly has a second position in which the first and second lock members are engaged, thereby preventing rotation of the mast. The lock assembly is actuatable between the first and second positions.

In some embodiments, the first lock member may include a collar assembly that is configured to be coupled to an exterior of the mast at a splined connection to prevent relative rotation therebetween. The collar assembly may include an upper ring and a lower ring that are coupled together with a cone seat positioned therebetween with the cone seat configured to be received between the collar assembly and a groove of the mast to prevent axial movement of the collar assembly relative to the mast. In certain embodiments, the upper ring may include first and second upper ring elements and the lower ring may include first and second lower ring elements. In such embodiments, the first upper ring element may be coupled to each of the first and second lower ring elements and the second upper ring element may be coupled to each of the first and second lower ring elements. In some embodiments, the first and second upper ring elements may be out of phase with the first and second lower ring elements such as ninety degrees out of phase.

In certain embodiments, the second lock member may include at least one lock pin and the first lock member may include at least one v-block, wherein the at least one v-block may be configured to receive the at least one lock pin therein when the first and second lock members are engaged, thereby rotationally clocking the proprotor assembly and preventing rotation of the mast. In some embodiments, a radial bearing may be coupled to the lock pin. In certain embodiments, the second lock member may include a pair of oppositely disposed lock pins and the first lock member may include a pair of oppositely disposed v-blocks, wherein each of the v-blocks may be configured to receive one of the lock pins therein when the first and second lock members are engaged, thereby rotationally clocking the proprotor assembly and preventing rotation of the mast. In some embodiments, a radial bearing may be coupled to each of the lock pins. In certain embodiments, the second lock member may include a piston that is configured to actuate the lock assembly between the first and second positions. In some embodiments, the piston may be a hydraulically actuated piston. In certain embodiments, a generally cylindrical guide may be coupled to the proprotor gearbox housing and the piston may be coupled to the guide by a splined connection to prevent relative rotation therebetween.

In a second aspect, the present disclosure is directed to a mast lockout system for a tiltrotor aircraft having a proprotor assembly. The system includes a mast coupled to and rotatable with the proprotor assembly. A proprotor gearbox having a proprotor gearbox housing is configured to transmit torque and rotation energy to the mast. First and second mast bearings are configured to react loads from the mast to the proprotor gearbox housing. A first lock member is coupled to the mast between the first and second mast bearings and is configured to rotate with the mast. The first lock member includes a collar assembly having first and second oppositely disposed v-blocks. A second lock member is coupled to the proprotor gearbox housing and is configured to be nonrotatable. The second lock member includes first and second oppositely disposed lock pins. The second lock member has a first position in which the first and second lock members are disengaged, thereby allowing rotation of the mast. The second lock member has a second position in which each of the lock pins of the second lock member is received within a respective one of the v-blocks of the first lock member, thereby rotationally clocking the proprotor assembly and preventing rotation of the mast. The second lock member is configured to be actuated between the first and second positions.

In certain embodiments, the collar assembly may be configured to be coupled to an exterior of the mast at a splined connection to prevent relative rotation therebetween. The collar assembly may include an upper ring and a lower ring that are coupled together with a cone seat positioned therebetween with the cone seat configured to be received between the collar assembly and a groove of the mast to prevent axial movement of the collar assembly relative to the mast. In some embodiments, the upper ring may include first and second upper ring elements and the lower ring may include first and second lower ring elements with the first upper ring element coupled to each of the first and second lower ring elements and the second upper ring element coupled to each of the first and second lower ring elements. In certain embodiments, the first and second upper ring elements may be out of phase with the first and second lower ring elements. In some embodiments, each of the lock pins may be configured to slide against one of the v-blocks as the second lock member engages the first lock member to rotationally clock the proprotor assembly. In certain embodiments, a radial bearing is coupled to each of the lock pins such that each of the radial bearings is configured to rotate against one of the v-blocks as the second lock member engages the first lock member to rotationally clock the proprotor assembly.

In a third aspect, the present disclosure is directed to a tiltrotor aircraft having rotary and non rotary flight modes. In the rotary flight mode, the tiltrotor aircraft operates at least two proprotor assemblies each having a plurality of proprotor blades. In the non rotary flight mode, the proprotor assemblies are rotationally locked. For each proprotor assembly, the aircraft includes a mast coupled to and rotatable with the proprotor assembly. A proprotor gearbox having a proprotor gearbox housing is configured to transmit torque and rotation energy to the mast. First and second mast bearings are configured to react loads from the mast to the proprotor gearbox housing. A lock assembly includes first and second lock members. The first lock member is coupled to the mast between the first and second mast bearings and is configured to rotate with the mast. The second lock member is coupled to the proprotor gearbox housing and is configured to be nonrotatable. The lock assembly has a first position in which the first and second lock members are disengaged, thereby allowing rotation of the mast. The lock assembly has a second position in which the first and second lock members are engaged, thereby preventing rotation of the mast. The lock assembly is actuatable between the first and second positions.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
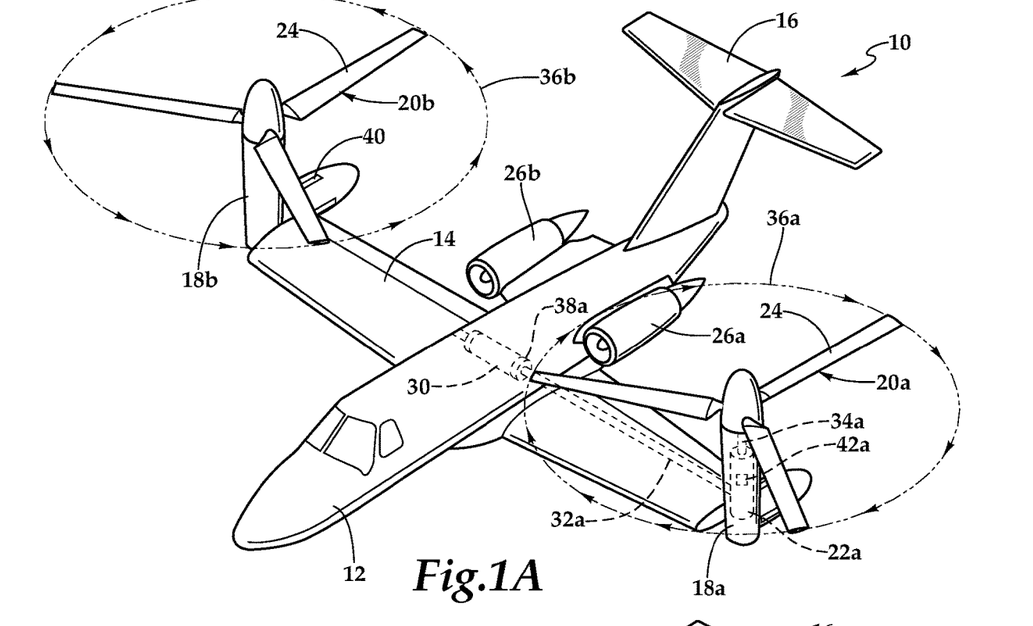
FIGS. 1A-1D are schematic illustrations of a tiltrotor aircraft in various flight modes in accordance with embodiments of the present disclosure.
Figure 1B:
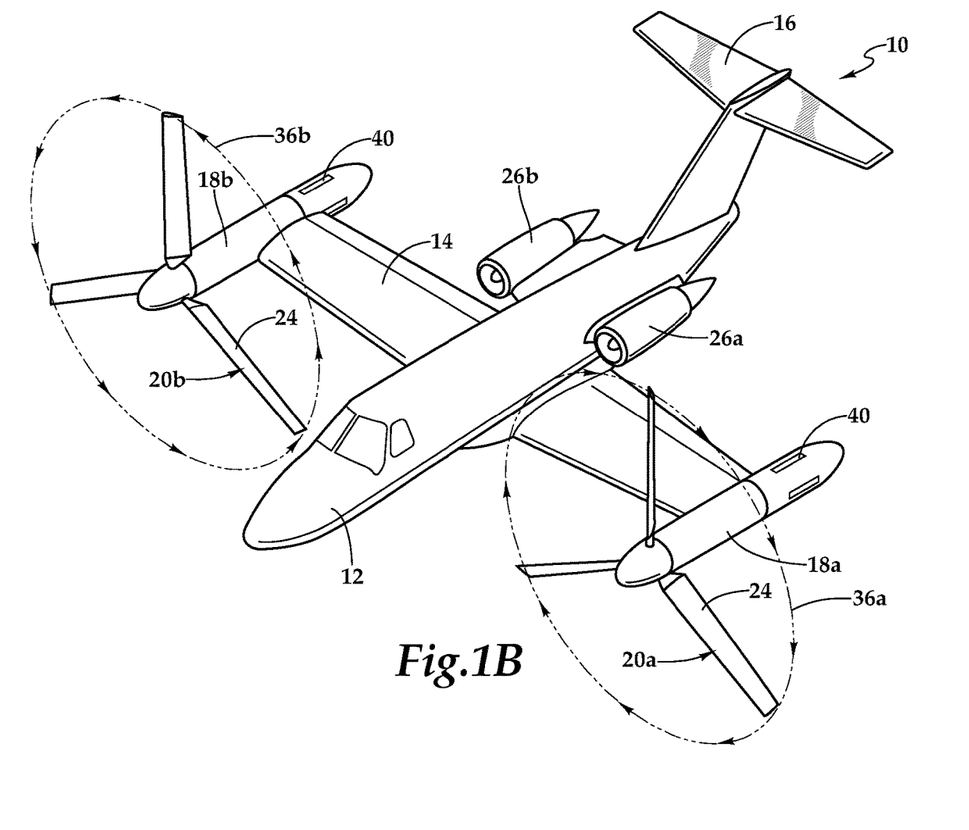
Figure 1C:
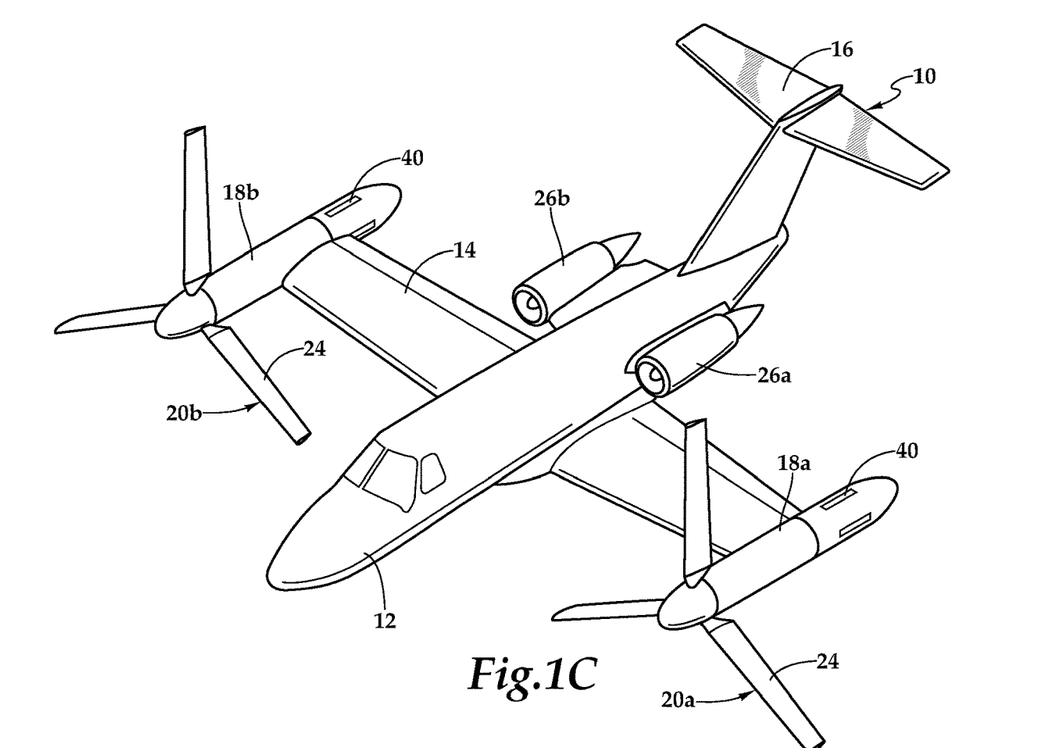
Figure 1D:
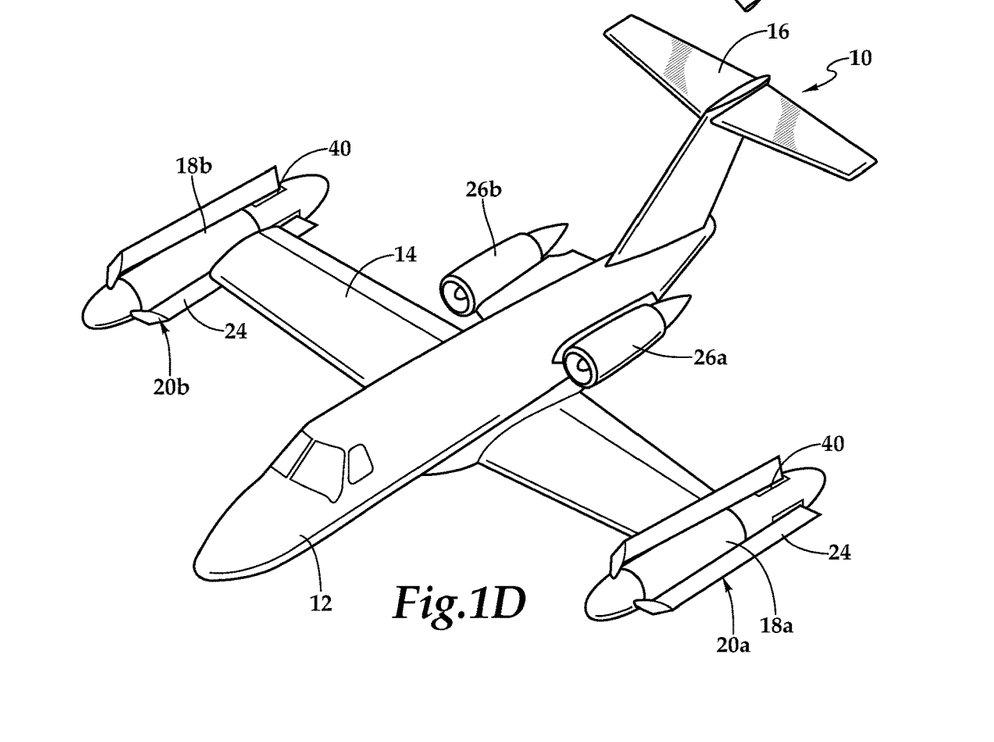

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. For example, a proprotor gearbox 22a is housed within pylon assembly 18a. Each proprotor gearbox includes a proprotor gearbox housing and a plurality of gears, such as planetary gears, used to adjust the engine output to a suitable rotational speed so that the engines and the proprotor assemblies may rotate at optimum speeds in rotary flight modes of aircraft 10.

Each proprotor assembly 20a, 20b includes a plurality of proprotor blades 24 that are operable to be rotated, as best seen in FIGS. 1A-1B, operable to be feathered, stopped, clocked and locked, as best seen in FIG. 1C and operable to be folded, as best seen in FIG. 1D. In the illustrated embodiment, proprotor assembly 20a is rotated responsive to torque and rotational energy provided by one or both of engines 26a, 26b via mid-wing gearbox 30, output shaft 32a, proprotor gearbox 22a and mast 34a. Similarly, proprotor assembly 20b is rotated responsive to torque and rotational energy provided by one or both of engines 26a, 26b via mid-wing gearbox 30, an output shaft (not pictured), a proprotor gearbox (not pictured) and a mast (not pictured). Engines 26a, 26b are located along an aft portion of fuselage 12. Engines 26a, 26b may be operated in a turboshaft mode, as best seen in FIGS. 1A-1B or a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide a vertical lift, such that aircraft 10 flies much like a conventional helicopter. In this configuration, engines 26a, 26b are operating in turboshaft mode wherein hot combustion gases in each engine 26a, 26b cause rotation of a power turbine coupled to a respective input shaft of mid-wing gearbox 30. Thus, in this configuration, aircraft 10 is considered to be in a rotary flight mode as proprotor assemblies 20a, 20b are providing thrust for aircraft 10. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In this configuration, engines 26a, 26b are operating in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b each include three proprotor blades 24 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

FIG. 1C illustrates aircraft 10 in transition between proprotor forward flight mode and airplane forward flight mode, in which engines 26a, 26b have been disengaged from proprotor assemblies 20a, 20b and proprotor blades 24 have been feathered, or oriented to be streamlined in the direction of flight, such that proprotor blades 24 act as brakes to aerodynamically slow the rotation of proprotor assemblies 20a, 20b. In the illustrated embodiment, the rotation of proprotor assemblies 20a, 20b is stopped using, for example, brake systems operably associated mid-wing gearbox 30, such as brake system 38a (see FIG. 1A). Preferably, the brake systems include position sensors such that the output shafts can be stopped at predetermined rotational positions. By stopping the output shafts in known rotational positions, the rotational positions of proprotor assemblies 20a, 20b are also known. This rotational clocking of proprotor blades 24 is important to prevent contact with wing 14 and to align each proprotor blade 24 with a respective slot 40 in pylon assemblies 18a, 18b for folding.

Due to the distance between the brake systems and proprotor assemblies 20a, 20b as well as the gear systems therebetween, use of the position sensors results in coarse rotational clocking of proprotor assemblies 20a, 20b. Once proprotor assemblies 20a, 20b have stopped and have been coarsely rotationally clocked, the mast lockout systems of the present disclosure, such as mast lockout system 42a (see FIG. 1A), are engaged to lock proprotor assemblies 20a, 20b against rotation and to precisely rotationally clock proprotor assemblies 20a, 20b such that each proprotor blade 24 will be aligned with a slot 40 for folding. In the illustrated configuration of aircraft 10 in FIG. 1C, engines 26a, 26b are operating in turbofan mode wherein hot combustion gases in each engine 26a, 26b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. In this configuration, aircraft 10 is considered to be in a non rotary flight mode as proprotor assemblies 20a, 20b are no longer providing thrust for aircraft 10.

FIG. 1D illustrates aircraft 10 in high speed, airplane forward flight mode, in which proprotor blades 24 have been folded to be oriented substantially parallel to respective pylon assemblies 18a, 18b to minimize the drag force generated by proprotor blades 24. To prevent chatter or other movement of proprotor blades 24 when folded, proprotor blades 24 are preferably received within slots 40 of pylon assemblies 18a, 18b. In this configuration, engines 26a, 26b are operating in the turbofan mode and aircraft 10 is considered to be in the non rotary flight mode. The forward cruising speed of aircraft 10 can be significantly higher in airplane forward flight mode versus proprotor forward flight mode as the forward airspeed induced proprotor aeroelastic instability is overcome.

Even though aircraft 10 has been described as having two engines fixed to the fuselage, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies having mast lockout systems are illustrated in the context of tiltrotor aircraft 10, it should be understood by those having ordinary skill in the art that the proprotor assemblies having mast lockout systems disclosed herein can be implemented on other tiltrotor aircraft including, for example, quad tiltrotor aircraft having an additional wing member aft of wing 14, unmanned tiltrotor aircraft or other tiltrotor aircraft configurations.

Figure 2:
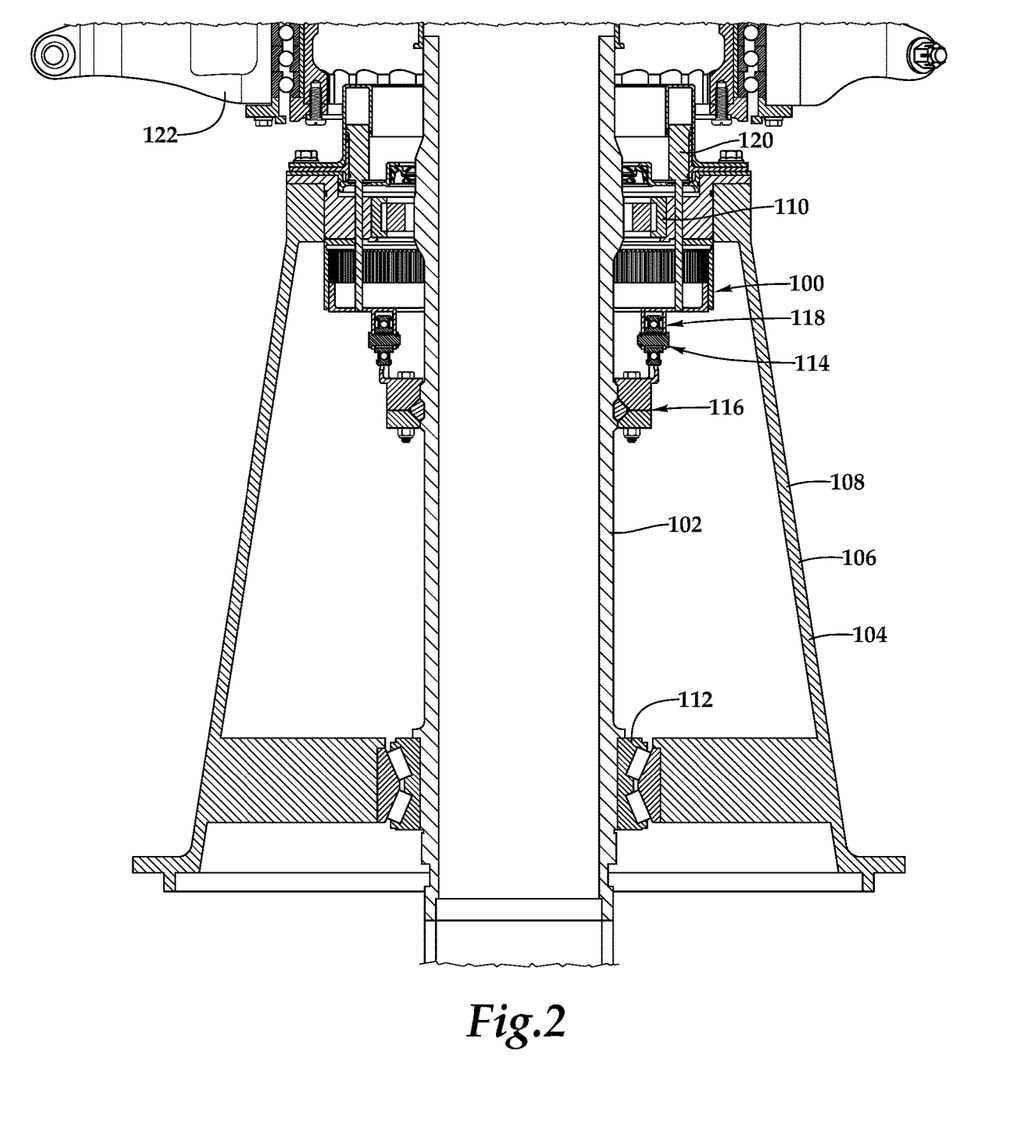
FIG. 2 is a cross sectional view of a top case and mast for a tiltrotor aircraft including a mast lockout system positioned between upper and lower mast bearings in accordance with embodiments of the present disclosure.

Referring to next to FIG. 2 of the drawings, a mast lockout system 100 for a tiltrotor aircraft is depicted. In the illustrated embodiment, mast lockout system 100 includes a mast 102 that receives torque and rotational energy from one or more engines, such as engines 26a, 26b, discussed herein, via a drivetrain including a proprotor gearbox 104. Proprotor gearbox 104 includes an outer housing 106 that is coupled to the airframe of aircraft 10. In the illustrated embodiment, the top case 108 of proprotor gearbox 104 is depicted. Mast 102 supplies torque and rotational energy to a proprotor assembly, such as proprotor assemblies 20a, 20b discussed herein. As such, mast 102 rotates with and supports the associated proprotor assembly. Top case 108 reacts mast loads during operation of tiltrotor aircraft 10 at upper mast bearings 110 and lower mast bearing 112. In the illustrated embodiment, mast lockout system 100 includes a lock assembly 114 having a rotating lock member 116 and a nonrotating lock member 118 which are positioned between upper mast bearings 110 and lower mast bearing 112. In addition, mast lockout system 100 includes an actuation system 120. Also illustrated is a portion of a pitch control system 122 used to adjust the pitch of the proprotor blades of the associated proprotor assembly.

Figure 3A:
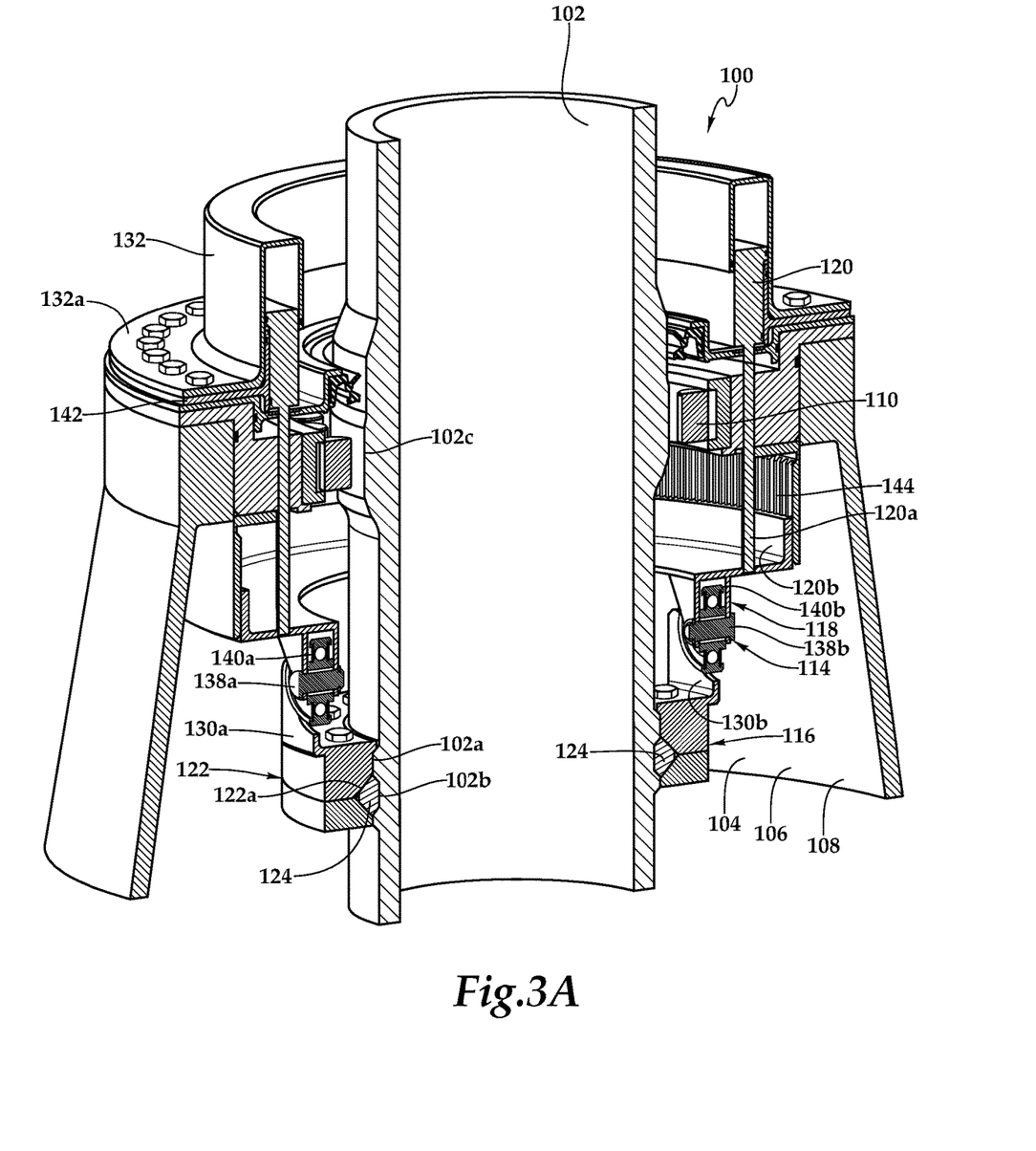
FIGS. 3A-3B are cross sectional views of a mast lockout system for a tiltrotor aircraft in accordance with embodiments of the present disclosure.
Figure 3B:
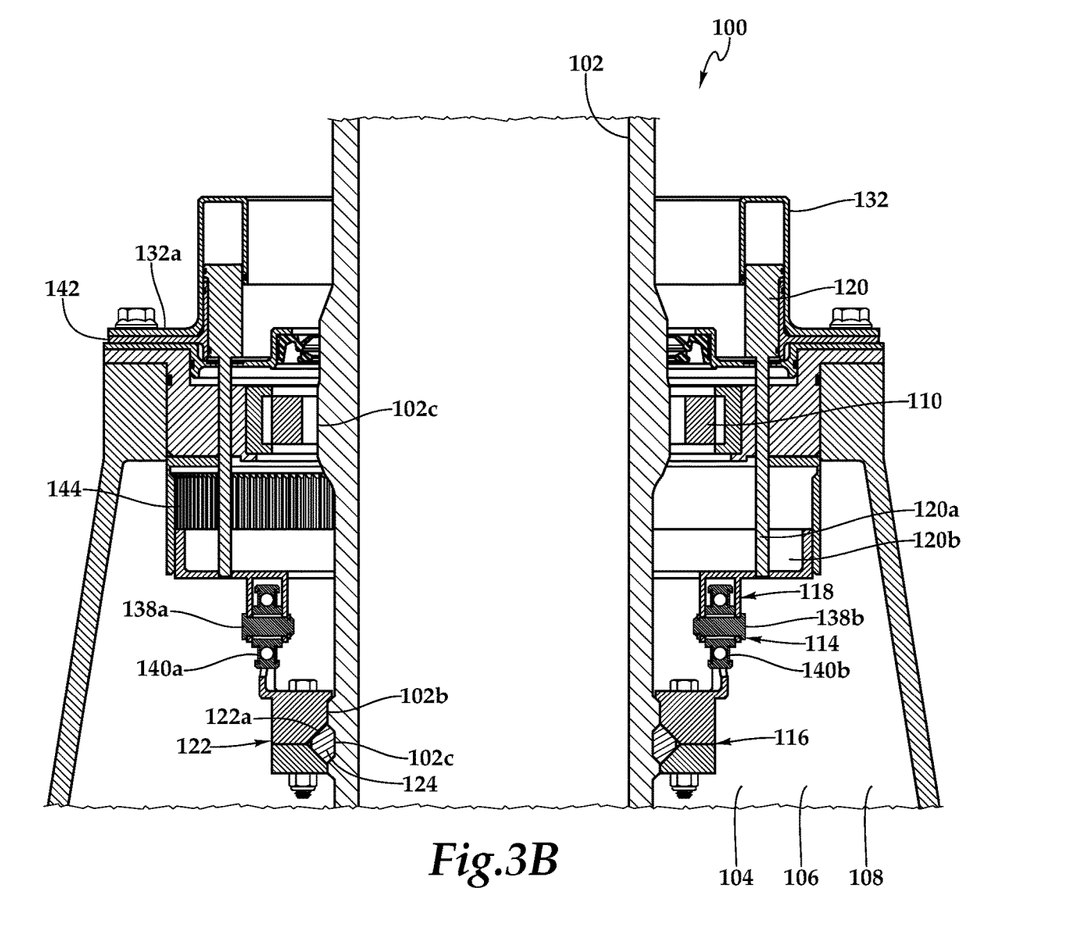
Figure 4A:
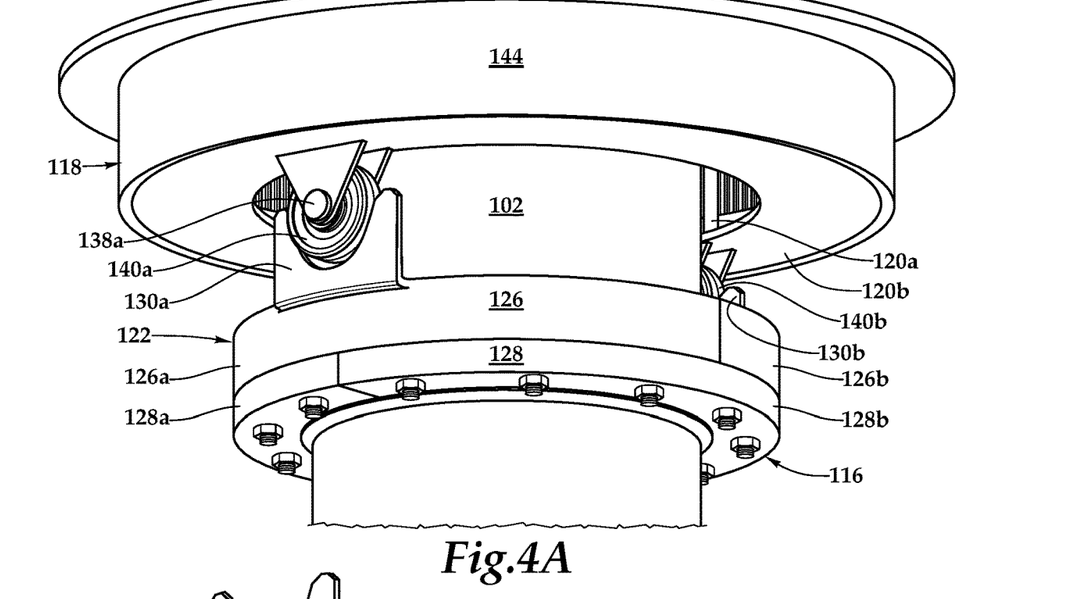
FIG. 4A depicts component parts of a lock assembly of a mast lockout system for a tiltrotor aircraft in accordance with embodiments of the present disclosure.
Figure 4B:
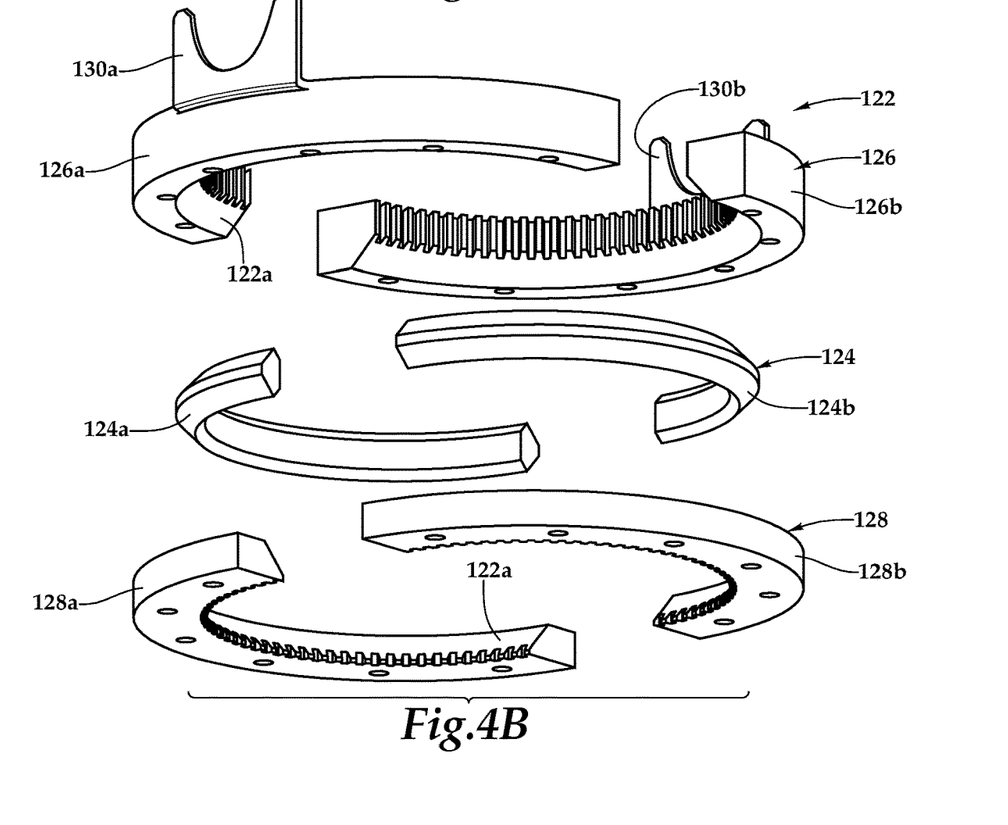
FIG. 4B is an exploded view of a rotating lock member of a mast lockout system for a tiltrotor aircraft in accordance with embodiments of the present disclosure.

Referring additionally to FIGS. 3A-3B of the drawings, enlarged views of mast lockout system 100 are depicted. A potion of mast 102 is shown within top case 108 and supported by upper mast bearings 110. Mast lockout system 100 includes a lock assembly 114 having a rotating lock member 116 and a nonrotating lock member 118. Rotating lock member 116 includes a collar assembly 122 that is coupled to the exterior of mast 102 at a spline connection with outer splines 102a of mast 102, which secures collar assembly 122 against relative rotation with mast 102. Collar assembly 122 is secured against axial movement relative to mast 102 by a cone seat 124 that is positioned between a groove 102b in mast 102 and a notch 122a of collar assembly 122. In the illustrated embodiment, upper bearing seat 102c of mast 102 has a larger outer diameter than the inner diameter of collar assembly 122. To enable installation of collar assembly 122 on mast 102, collar assembly is constructed of multiple elements. As best seen in FIG. 4A-4B, collar assembly 122 includes an upper ring 126 formed from two upper ring elements 126a, 126b each extending circumferentially approximately 180 degrees and each having a plurality of bolt holes. Collar assembly 122 also includes a lower ring 128 formed from two lower ring elements 128a, 128b each extending circumferentially approximately 180 degrees and each having a plurality of bolt holes. Cone seat 124 is formed from two cone seat elements 124a, 124b each extending circumferentially approximately 180 degrees.

To install collar assembly 122 on mast 102, cone seat elements 124a, 124b are first positioned within groove 102b. Upper ring elements 126a, 126b are positioned above cone seat elements 124a, 124b and meshed with outer splines 102a of mast 102 to form upper ring 126. Likewise, lower ring elements 128a, 128b are positioned below cone seat elements 124a, 124b and meshed with outer splines 102a of mast 102 to form lower ring 128. A plurality of bolts is used to secure upper ring 126 to lower ring 128 which clamps cone seat 124 therebetween and between notch 122a formed by upper and lower rings 126, 128 and groove 102b of mast 102. Preferably, upper ring elements 126a, 126b and lower ring elements 128a, 128b are out of phase with each other by ninety degrees, as shown in FIG. 4A, such that upper ring element 126a is coupled to both lower ring element 128a and lower ring element 128b and such that upper ring element 126b is coupled to both lower ring element 128a and lower ring element 128b. Similarly, cone seat elements 124a, 124b are preferably positioned out of phase with both upper ring elements 126a, 126b and lower ring elements 128a, 128b by forty-five degrees. This configuration provides the desired stiffness to collar assembly 122. In other embodiments, upper ring elements 126a, 126b, lower ring elements 128a, 128b and/or cone seat elements 124a, 124b may have other out of phase angles. In addition, in other embodiments, upper ring 126, lower ring 128 and/or cone seat 124 may have other numbers of elements and/or elements that extend in circumferential sections other than 180 degrees.

Figure 5A:
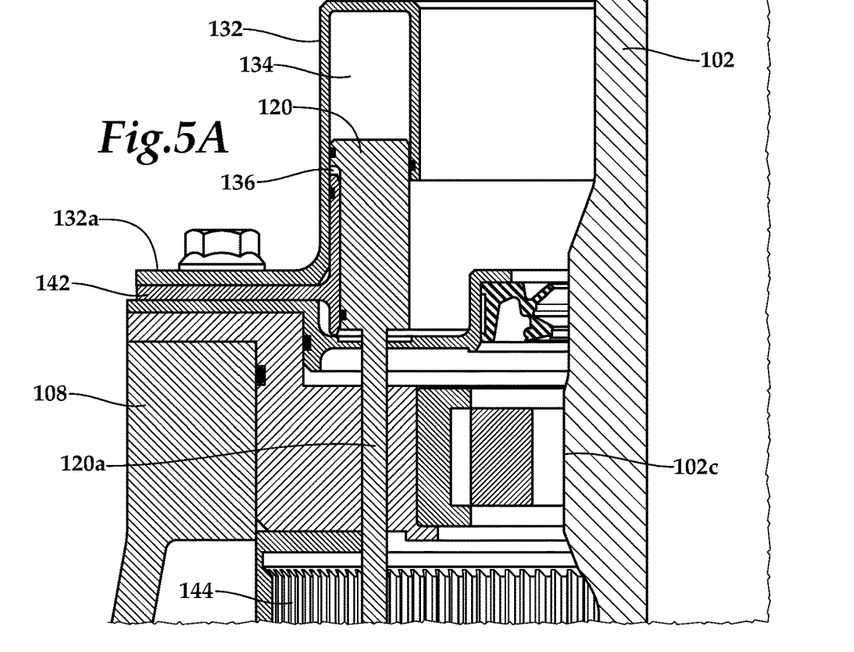
FIGS. 5A-5B are cross sectional views of a piston in actuated and unactuated positions of a mast lockout system for a tiltrotor aircraft in accordance with embodiments of the present disclosure.
Figure 5B:
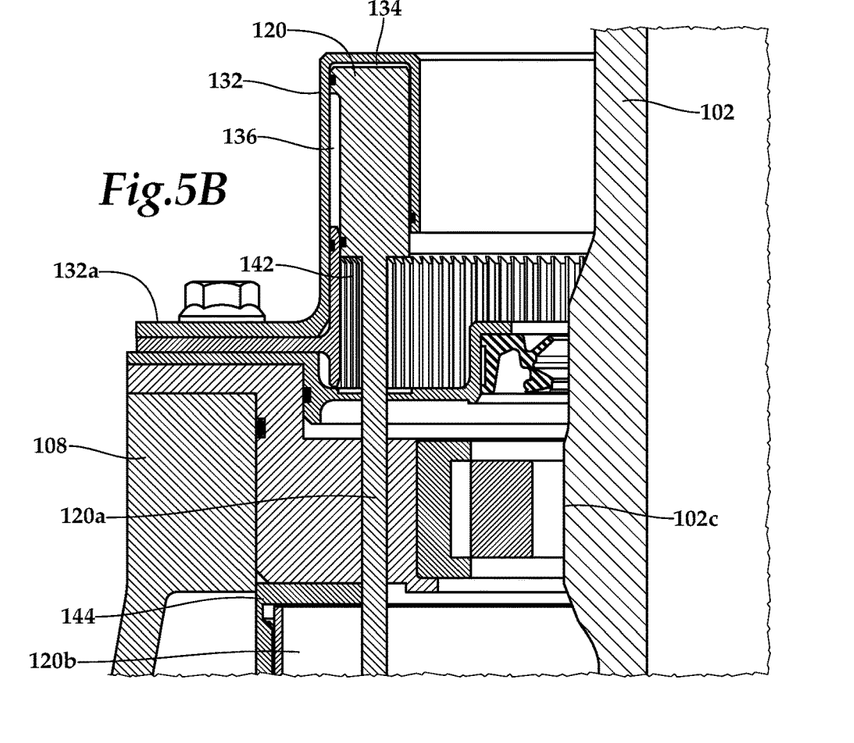

As discussed herein, collar assembly 122 is coupled to mast 102 at a splined connection to prevent relative rotation therebetween. Thus, rotating lock member 116 rotates with mast 102. In the illustrated embodiment, rotating lock member 116 includes two oppositely disposed v-blocks 130a, 130b. V-block 130a extend upwardly from upper ring element 126a and v-block 130b extend upwardly from upper ring element 126b. Nonrotating lock member 118 includes a generally cylindrical piston housing 132. As used herein, the term "generally cylindrical" refers to a part that has a cylindrical component with or without an internal or external stepped profile and with or without addition non cylindrical features. In the illustrated embodiment, piston housing 132 includes a flared portion 132a having a plurality of bolt holes such that piston housing 132 may be secured to top case 108 by a plurality of bolts. A generally cylindrical piston 120 is at least partially disposed within piston housing 132. As best seen in FIGS. 5A-5B, piston 120 defines an upper chamber 134 and a lower chamber 136 with piston housing 132. Preferably, at least one hydraulic valve is in fluid communication with upper chamber 134 and at least one hydraulic valve is in fluid communication with lower chamber 136. In the illustrated embodiment, piston 120 include four struts 120a that extend downwardly and are coupled to a generally cylindrical piston shelf 120b that supports two oppositely disposed lock pins 138a, 138b. In the illustrated embodiment, optional radial bearings 140a, 140b are positioned on lock pins 138a, 138b, respectively. Radial bearings 140a, 140b are preferably radial ball bearing assemblies that have outer races that are operable for rotation about the respective lock pins 138a, 138b. Nonrotating lock member 118 includes a generally cylindrical upper guide 142 that is securably coupled to upper case 108 with a plurality of bolts. Piston 120 is coupled to upper guide 142 by a splined connection to prevent relative rotation therebetween. Nonrotating lock member 118 also includes a generally cylindrical lower guide 144 that is securably coupled to upper case 108. Piston shelf 120b is coupled to lower guide 144 by a splined connection to prevent relative rotation therebetween. The splined connections, however, allows for axial movement of piston 120 relative to upper guide 142 and piston shelf 120b relative to lower guide 144.

Figure 6A:
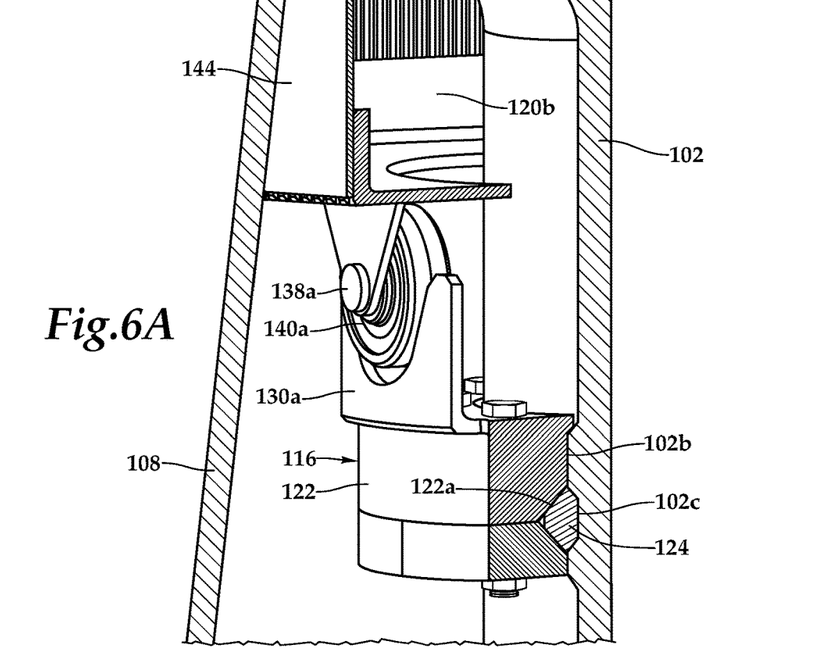
FIGS. 6A-6B are cross sectional views of a pin lock and v-block in engaged and disengaged positions of a mast lockout system for a tiltrotor aircraft in accordance with embodiments of the present disclosure.
Figure 6B:
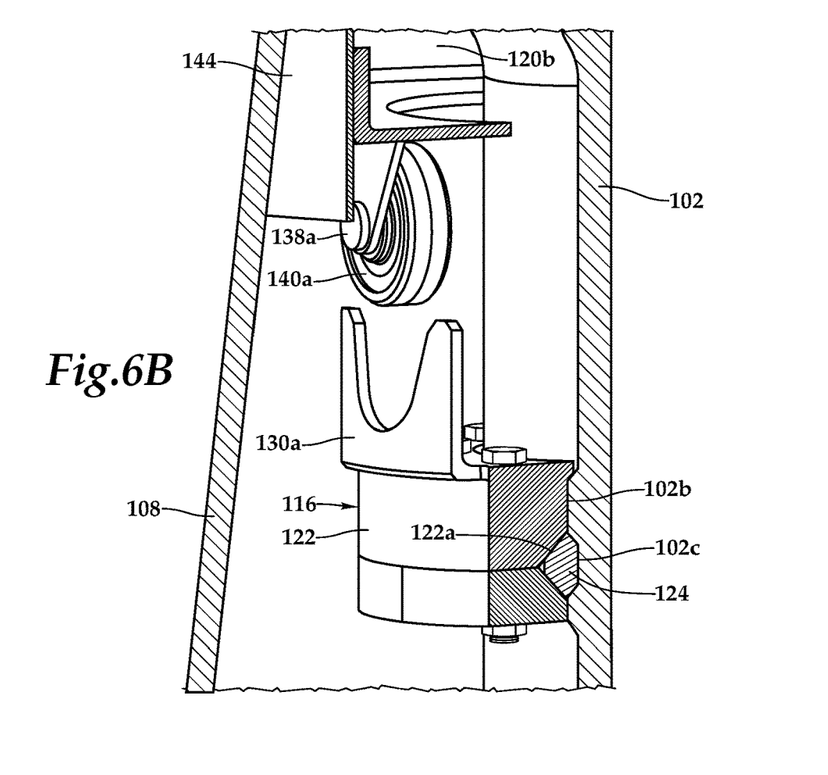

The operation of mast lockout system 100 will now be described. When it is desired to transition aircraft 10 from the proprotor forward flight mode to the airplane forward flight mode, the engines are disengaged from the proprotor assemblies and the proprotor blades are feathered for aerodynamic braking. The brake systems may then be engaged to fully stop the rotation of the proprotor assemblies. As discussed herein, the braking systems may incorporate position sensors to provide coarse rotational clocking of the proprotor blades. The coarse rotational clocking has a tolerance that is sufficient to circumferentially align the open ends of v-blocks 130a, 130b with lock pins 138a, 138b, as best seen in FIG. 6B, which represents the disengaged position of mast lockout system 100. When mast lockout system 100 is in the disengaged position, hydraulic fluid enters upper chamber 134 and exits lower chamber 136. The hydraulic pressure acting on an upper surface of piston 120 actuates piston 120 shifting mast lockout system 100 from the disengaged position, as depicted in FIG. 6B, to the engaged position of mast lockout system 100, depicted in FIG. 6A.

The actuation of piston 120 causes lock pins 138a, 138b to move toward v-blocks 130a, 130b. In the illustrated embodiment, as lock pins 138a, 138b move toward v-blocks 130a, 130b, each of radial bearings 140a, 140b contacts a surface of a respective v-block 130a, 130b. If there is any misalignment of radial bearings 140a, 140b relative to the center of v-blocks 130a, 130b, each of radial bearings 140a, 140b will contact and rotate against an angled surface of the respective v-block 130a, 130b causing mast 102 to rotate relative to upper case 108. This mast rotation precisely rotationally clocks the associated proprotor assembly such that each of the proprotor blades will be aligned with a slot 40 for folding. In embodiments that do not include radial bearings 140a, 140b, if there is any misalignment of lock pins 138a, 138b relative to the center of v-blocks 130a, 130b, each of lock pins 138a, 138b will contact and slide against an angled surface of the respective v-block 130a, 130b causing mast 102 to rotate relative to upper case 108. This mast rotation precisely rotationally clocks the associated proprotor assembly such that each of the proprotor blades will be aligned with a slot 40 for folding. In either implementation, once piston 120 is hydraulically actuated to shift mast lockout system 100 from the disengaged position (FIG. 6B) to the engaged position (FIG. 6A), rotation of the associated proprotor assembly is prevented as mast 102 is locked against rotation relative to upper case 108. When it is desired to transition aircraft 10 from the airplane forward flight mode back to the proprotor forward flight mode, hydraulic fluid enters lower chamber 136 and exits upper chamber 134. The hydraulic pressure acting on a lower surface of piston 120 actuates piston 120 shifting mast lockout system 100 from the engaged position, as depicted in FIG. 6A, to the disengaged position of mast lockout system 100, depicted in FIG. 6B. Thereafter, the engines are reengaged with the proprotor assemblies returning aircraft 10 to the rotary flight mode.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A mast lockout system for a tiltrotor aircraft having a proprotor assembly, the system comprising:
    a mast coupled to and rotatable with the proprotor assembly;
    a proprotor gearbox having a proprotor gearbox housing, the proprotor gearbox configured to transmit torque and rotation energy to the mast;
    first and second mast bearings configured to react loads from the mast to the proprotor gearbox housing; and
    a lock assembly having first and second lock members, the first lock member coupled to the mast between the first and second mast bearings and configured to rotate with the mast, the second lock member coupled to the proprotor gearbox housing and configured to be nonrotatable;
    wherein, the lock assembly has a first position in which the first and second lock members are disengaged, thereby allowing rotation of the mast;
    wherein, the lock assembly has a second position in which the first and second lock members are engaged, thereby preventing rotation of the mast; and
    wherein, the lock assembly is actuatable between the first and second positions.

2. The system as recited in claim 1 wherein the first lock member further comprises a collar assembly that is configured to be coupled to an exterior of the mast at a splined connection to prevent relative rotation therebetween.

3. The system as recited in claim 2 wherein the collar assembly further comprises an upper ring and a lower ring that are coupled together with a cone seat positioned therebetween, the cone seat configured to be received between the collar assembly and a groove of the mast to prevent axial movement of the collar assembly relative to the mast.

4. The system as recited in claim 3 wherein the upper ring further comprises first and second upper ring elements and wherein the lower ring further comprises first and second lower ring elements, the first upper ring element coupled to each of the first and second lower ring elements and the second upper ring element coupled to each of the first and second lower ring elements.

5. The system as recited in claim 4 wherein the first and second upper ring elements are out of phase with the first and second lower ring elements.

6. The system as recited in claim 4 wherein the first and second upper ring elements are ninety degrees out of phase with the first and second lower ring elements.

7. The system as recited in claim 1 wherein the second lock member further comprises at least one lock pin and wherein the first lock member further comprises at least one v-block, the at least one v-block configured to receive the at least one lock pin therein when the first and second lock members are engaged, thereby rotationally clocking the proprotor assembly and preventing rotation of the mast.

8. The system as recited in claim 7 further comprising a radial bearing coupled to the lock pin.

9. The system as recited in claim 1 wherein the second lock member further comprises a pair of oppositely disposed lock pins and wherein the first lock member further comprises a pair of oppositely disposed v-blocks, each of the v-blocks configured to receive one of the lock pins therein when the first and second lock members are engaged, thereby rotationally clocking the proprotor assembly and preventing rotation of the mast.

10. The system as recited in claim 9 further comprising a radial bearing coupled to each of the lock pins.

11. The system as recited in claim 1 wherein the second lock member further comprises a piston that is configured to actuate the lock assembly between the first and second positions.

12. The system as recited in claim 11 wherein the piston further comprises a hydraulically actuated piston.

13. The system as recited in claim 11 further comprising a generally cylindrical guide coupled to the proprotor gearbox housing and wherein, the piston is coupled to the guide by a splined connection to prevent relative rotation therebetween.

14. A mast lockout system for a tiltrotor aircraft having a proprotor assembly, the system comprising:
- a mast coupled to and rotatable with the proprotor assembly;
- a proprotor gearbox having a proprotor gearbox housing, the proprotor gearbox configured to transmit torque and rotation energy to the mast;
- first and second mast bearings configured to react loads from the mast to the proprotor gearbox housing;
- a first lock member coupled to the mast between the first and second mast bearings and configured to rotate with the mast, the first lock member including a collar assembly having first and second oppositely disposed v-blocks; and
- a second lock member coupled to the proprotor gearbox housing and configured to be nonrotatable, the second lock member including first and second oppositely disposed lock pins;
- wherein, the second lock member has a first position in which the first and second lock members are disengaged, thereby allowing rotation of the mast;
- wherein, the second lock member has a second position in which each of the lock pins of the second lock member is received within a respective one of the v-blocks of the first lock member, thereby rotationally clocking the proprotor assembly and preventing rotation of the mast; and
- wherein, the second lock member is configured to be actuated between the first and second positions.

15. The system as recited in claim 14 wherein the first lock member further comprises a collar assembly that is configured to be coupled to an exterior of the mast at a splined connection to prevent relative rotation therebetween and wherein the collar assembly further comprises an upper ring and a lower ring that are coupled together with a cone seat positioned therebetween, the cone seat configured to be received between the collar assembly and a groove of the mast to prevent axial movement of the collar assembly relative to the mast.

16. The system as recited in claim 15 wherein the upper ring further comprises first and second upper ring elements and wherein the lower ring further comprises first and second lower ring elements, the first upper ring element coupled to each of the first and second lower ring elements and the second upper ring element coupled to each of the first and second lower ring elements.

17. The system as recited in claim 16 wherein the first and second upper ring elements are out of phase with the first and second lower ring elements.

18. The system as recited in claim 14 wherein each of the lock pins is configured to slide against one of the v-blocks as the second lock member engages the first lock member to rotationally clock the proprotor assembly.

19. The system as recited in claim 14 further comprising a radial bearing coupled to each of the lock pins and wherein each of the radial bearings are configured to rotate against one of the v-blocks as the second lock member engages the first lock member to rotationally clock the proprotor assembly.

20. A tiltrotor aircraft having rotary and non rotary flight modes, in the rotary flight mode, the tiltrotor aircraft operating at least two proprotor assemblies each having a plurality of proprotor blades, in the non rotary flight mode, the proprotor assemblies are rotationally locked, for each proprotor assembly the aircraft comprising:
- a mast coupled to and rotatable with the proprotor assembly;
- a proprotor gearbox having a proprotor gearbox housing, the proprotor gearbox configured to transmit torque and rotation energy to the mast;
- first and second mast bearings configured to react loads from the mast to the proprotor gearbox housing; and
- a lock assembly having first and second lock members, the first lock member coupled to the mast between the first and second mast bearings and configured to rotate with the mast, the second lock member coupled to the proprotor gearbox housing and configured to be nonrotatable;
- wherein, the lock assembly has a first position in which the first and second lock members are disengaged, thereby allowing rotation of the mast;
- wherein, the lock assembly has a second position in which the first and second lock members are engaged, thereby preventing rotation of the mast; and
- wherein, the lock assembly is actuatable between the first and second positions.

* * * * *